United States Patent
Kim et al.

(10) Patent No.: US 7,738,208 B2
(45) Date of Patent: Jun. 15, 2010

(54) DATA RECOVERY THROUGH ELIMINATING ADJACENT TRACK INTERFERENCE

(75) Inventors: Na Young Kim, San Jose, CA (US); Yawshing Tang, Saratoga, CA (US); Carl Xiaodong Che, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 436 days.

(21) Appl. No.: 11/998,396

(22) Filed: Nov. 28, 2007

(65) Prior Publication Data
US 2009/0135693 A1 May 28, 2009

(51) Int. Cl.
*G11B 15/04* (2006.01)
(52) U.S. Cl. ...................................................... 360/60
(58) Field of Classification Search .................. 360/60, 360/53, 31, 75, 77.04, 77.06, 77.08, 73.12
See application file for complete search history.

(56) References Cited

U.S. PATENT DOCUMENTS

| 4,542,428 | A | * | 9/1985 | Yanagi | 360/75 |
| 4,872,154 | A | * | 10/1989 | Sakagami et al. | 369/53.36 |
| 5,245,595 | A | * | 9/1993 | Yasukawa | 369/30.12 |
| 5,703,848 | A | * | 12/1997 | Hofer | 369/44.29 |
| 5,710,748 | A | * | 1/1998 | Hofer | 369/44.35 |
| 5,812,337 | A | * | 9/1998 | Tanaka et al. | 360/73.12 |
| 6,310,741 | B1 | * | 10/2001 | Nishida et al. | 360/53 |
| 6,405,277 | B1 | * | 6/2002 | Jen et al. | 711/4 |
| 6,657,805 | B2 | * | 12/2003 | Nishida et al. | 360/60 |
| 6,975,566 | B2 | * | 12/2005 | Park | 369/44.28 |
| 7,215,497 | B2 | * | 5/2007 | Urata | 360/53 |
| 7,333,285 | B2 | * | 2/2008 | Cho et al. | 360/75 |
| 7,502,283 | B2 | * | 3/2009 | Schmidt et al. | 369/13.11 |
| 7,529,058 | B2 | * | 5/2009 | Hara et al. | 360/77.06 |
| 2005/0180267 | A1 | * | 8/2005 | Jeong et al. | 368/96 |
| 2007/0183081 | A1 | * | 8/2007 | Noda et al. | 360/77.08 |
| 2007/0188905 | A1 | * | 8/2007 | Maeno et al. | 360/53 |
| 2008/0174905 | A1 | * | 7/2008 | Ueda | 360/77.04 |

* cited by examiner

*Primary Examiner*—Fred Tzeng
(74) *Attorney, Agent, or Firm*—Ben J. Yorks; Irell & Manella LLP

(57) ABSTRACT

A hard disk drive with a disk that contains a target track and an adjacent track. The drive includes a circuit that determines an error in data read from the target track. Data from the adjacent track is stored in memory. The adjacent track is then erased and the target track data is re-read from the target track. Erasing the adjacent track allows the target track data to be read without adjacent track interference. The data from the adjacent track is typically rewritten onto the disk from memory so no data is lost.

12 Claims, 4 Drawing Sheets

DATA RECOVERY THROUGH ELIMINATING ADJACENT TRACK INTERFERENCE

BACKGROUND OF THE INVENTION

1. Field of the Invention

The present invention relates to reading data in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Data is typically stored in sectors that are located within concentric radial tracks on the surfaces of the disks. Errors may occur when reading data. There have been developed various error recovery schemes to recover data read from disk. One source of error may be stray flux from an adjacent track. The stray flux causes noise that degrades the quality of the read signal and create errors in the data. This is commonly referred to as adjacent track interference ("ATI"). Unfortunately, conventional error recovery schemes do not always compensate for errors caused by ATI.

BRIEF SUMMARY OF THE INVENTION

A hard disk drive with a disk that contains a target track and an adjacent track. The drive includes a circuit that determines an error in track data read from the target track. Data from the adjacent track is stored in memory. The adjacent track is then erased and the target track data is re-read from the target track.

DETAILED DESCRIPTION

Disclosed is a hard disk drive with a disk that contains a target track and an adjacent track. The drive includes a circuit that determines an error in target track data read from the target track. If the data contains an error(s), then an error recovery scheme will be employed to recover the data. If this process is unsuccessful the data from the adjacent track is stored in memory. The adjacent track is then erased and the target track data is re-read from the target track. Erasing the adjacent track allows the target track data to be read without adjacent track interference. The data from the adjacent track is typically rewritten onto the disk from memory so no data is lost.

Figure 1:
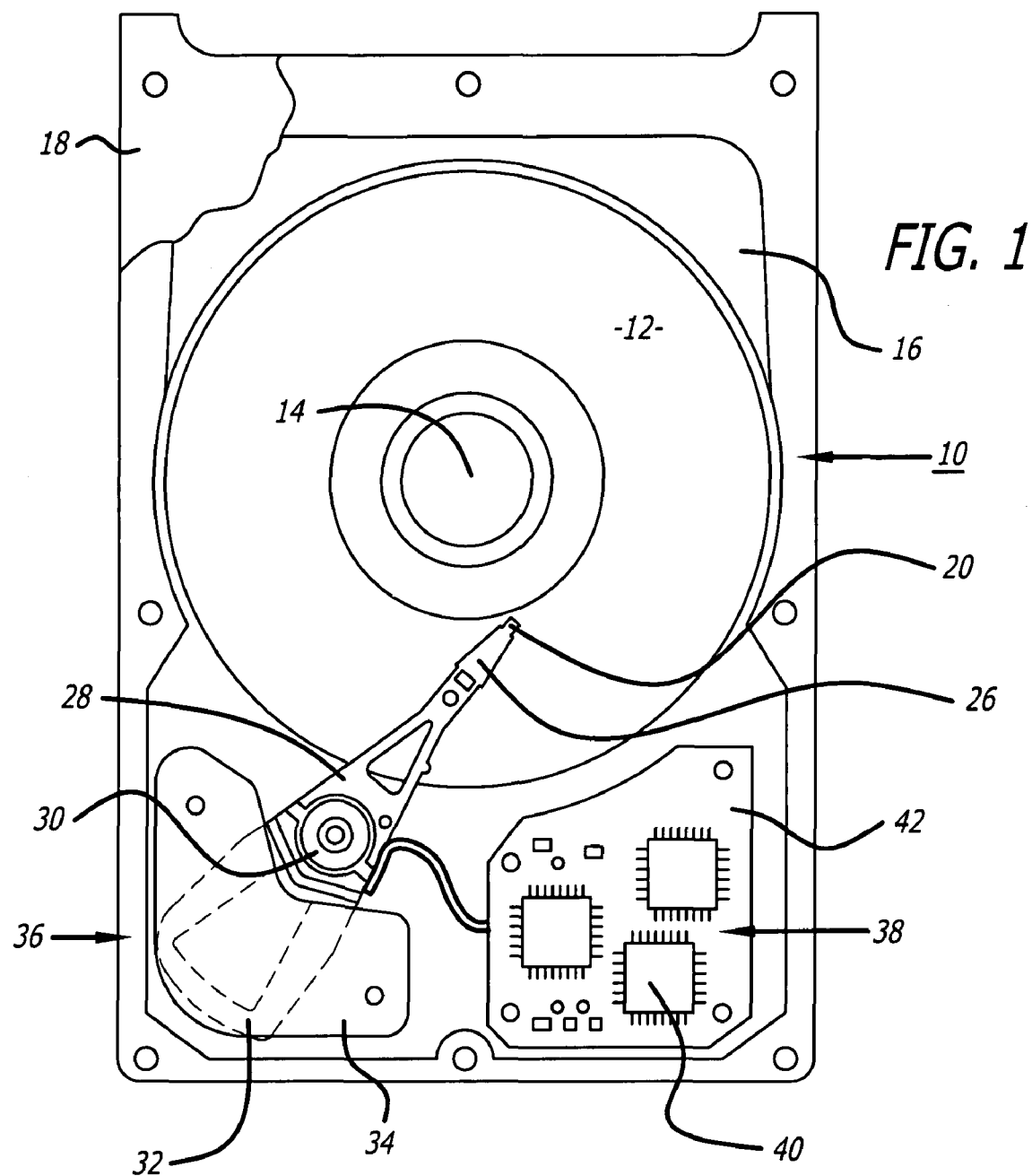
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
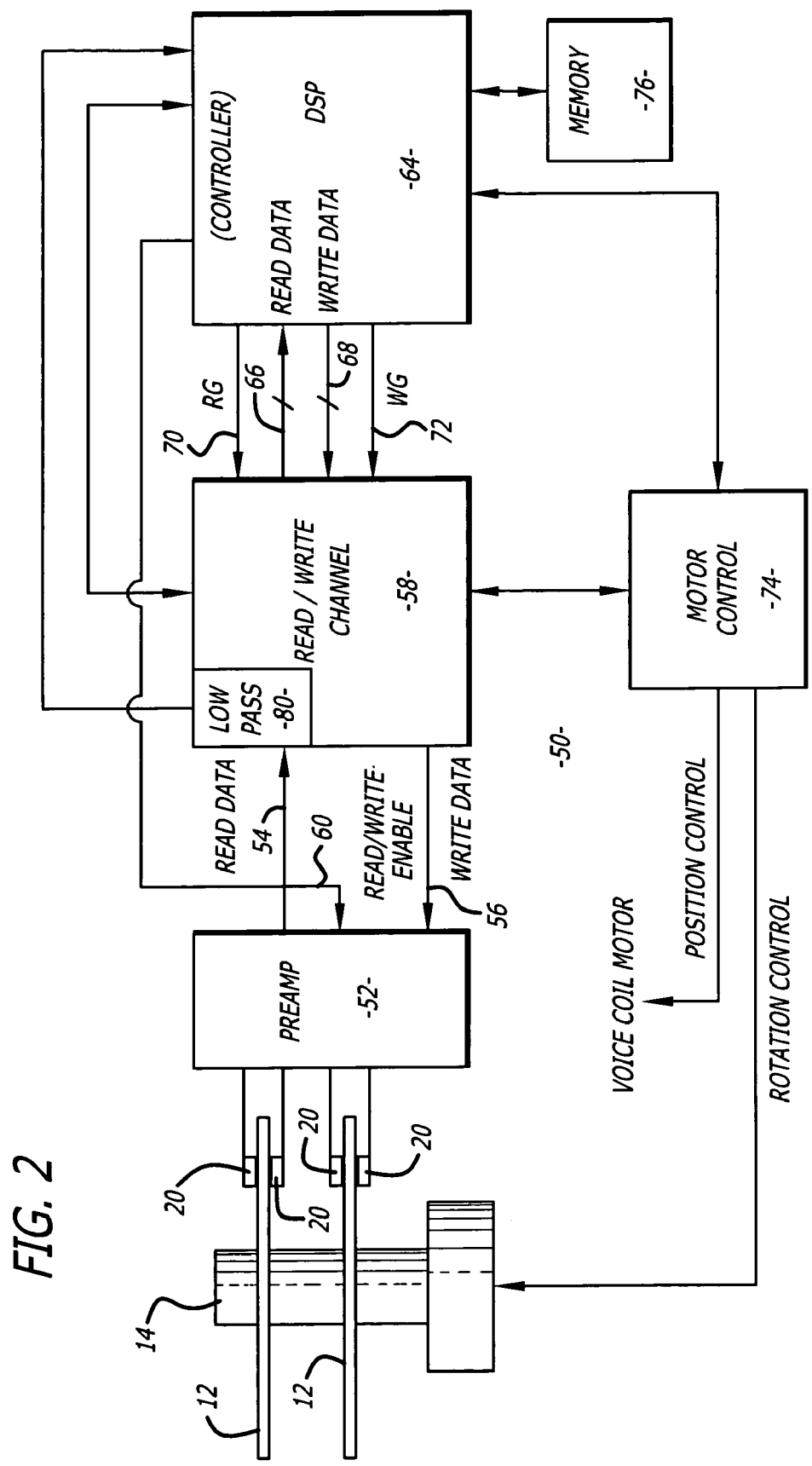
FIG. 2 is a schematic of an electrical circuit for the hard disk drive.

The disk drive 10 may include a plurality of heads 20 located adjacent to the disks 12. As shown in FIG. 2 the heads 20 may have separate write (not shown) and read elements (not shown). The write element magnetizes the disk 12 to write data. The read element senses the magnetic fields of the disks 12 to read data. By way of example, the read element may be constructed from a magneto-resistive material that has a resistance which varies linearly with changes in magnetic flux.

The data is stored a plurality of concentric track, including a target track 22 and an adjacent track 24. A target track will be considered a track of a disk that is being read.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

FIG. 2 shows an embodiment of an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM") that contains instructions that are read by the controller 64.

Figure 3:
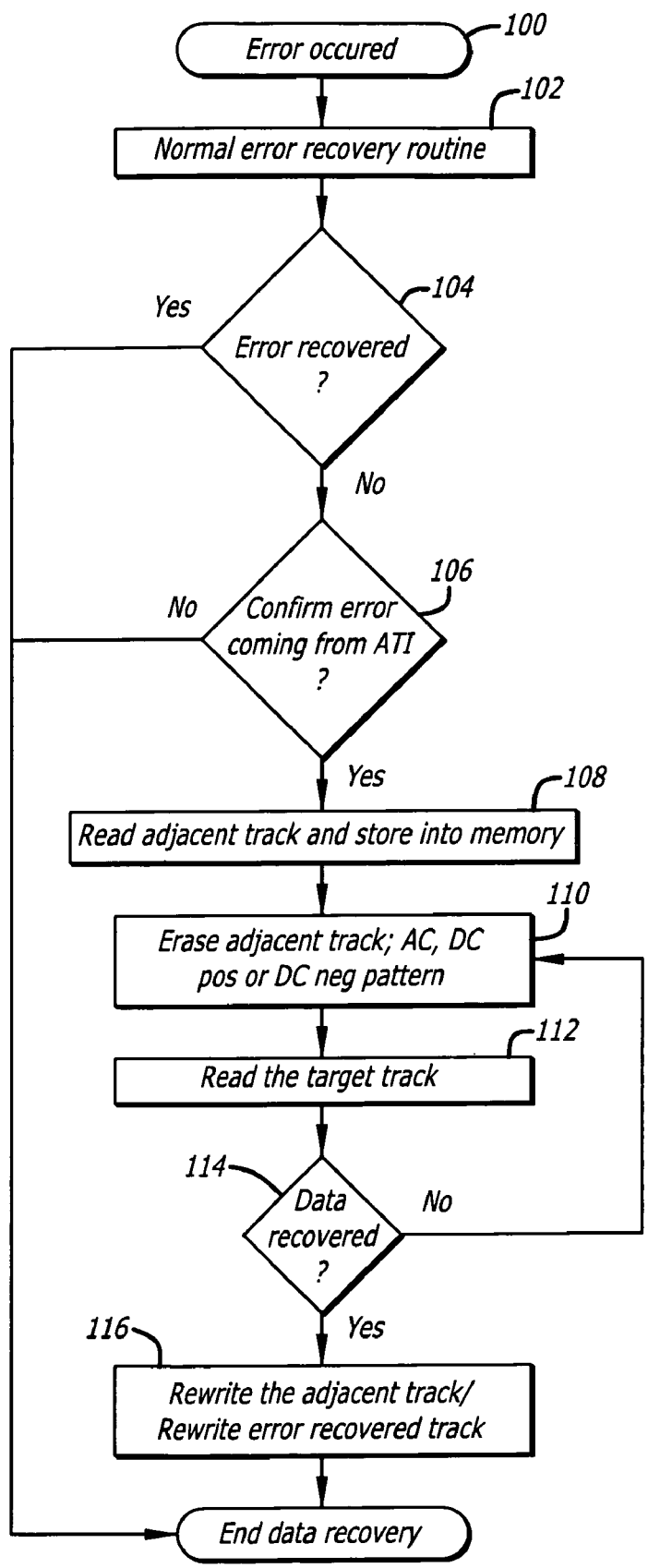
FIG. 3 is a flowchart showing a process for recovering data from a hard disk drive.

The flowchart shown in FIG. 3 provides a process for recovering data from the disk. The processes can be performed by the controller 64. In step 100 data is read from a target track. The data contains an error. In step 102 an error recovery scheme is employed in an attempt to recover the bad data. In decision block 104 it is determined whether the error is recovered. If so, the process is completed. If not, the process continues to decision step 106 where it is determined whether the error is from adjacent track interference. If not, the process is completed. If so, the process continues to step 108.

In block 108 data is read from an adjacent track and stored in memory. The adjacent track is erased in step 110. The adjacent track can be erased by any number of known erasure techniques such as AC erase, DC positive erase or DC negative erase. The target track data is then re-read from the target track in step 112. In decision block 114, it is determined whether the data is recovered. If so, then the adjacent track data is retrieved from memory and re-written onto the adjacent track in step 116. The target track may also be rewritten. If data is not recovered the process returns to step 110 and repeated. A different erase process may be utilized in subsequent erase steps. For example, an AC erase may be utilized during the first iteration, a DC positive erase may be utilized in a second iteration, and a DC negative may be employed during a third iteration. It is to be understood that the order of erasure types can be varied. For example, a DC positive erase may be used in the first iterations.

Figure 4:
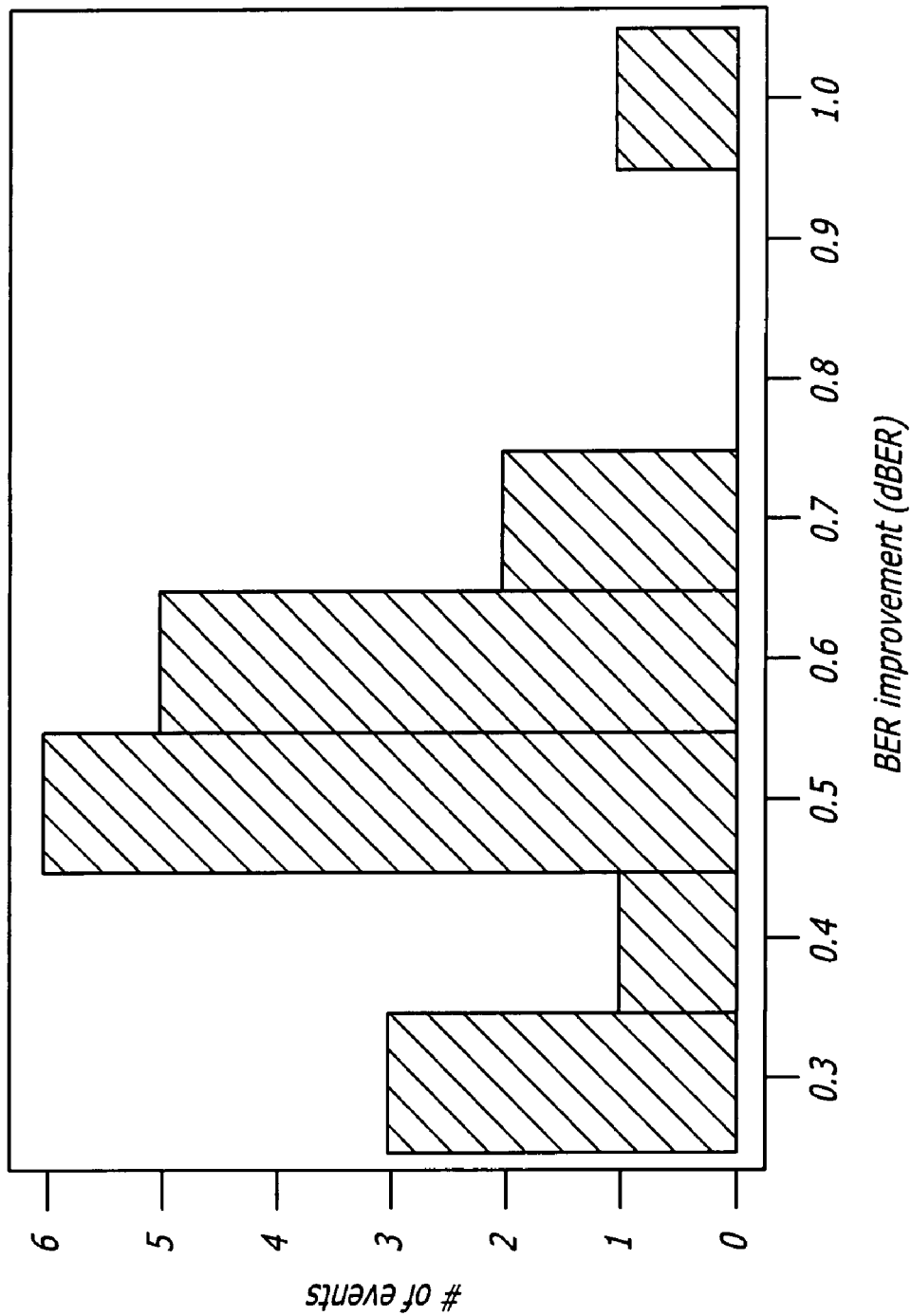
FIG. 4 is a graph showing improvement in bit error rate ("BER") using the process of the present invention.

By erasing the adjacent track the target track can be read without adjacent track interference. This allows for a lower bit error rate of the disk drive. FIG. 4 shows the results of a test that was performed using the process described in FIG. 3. The graph shows how the bit error rate ("BER") is improved per the number of events or process iterations.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

By way of example, although a process is described wherein one adjacent track is erased to read a target track, it is to be understood that multiple adjacent tracks can be erased before the target track is re-read. Additionally, one or more tracks may be erased on either side of the target track before the track is re-read.

What is claimed is:

1. A hard disk drive, comprising:
   a disk that contains a target track with target track data and an adjacent track with adjacent track data;
   a spindle motor that rotates said disk;
   a head that is coupled to said disk;
   a memory; and,
   a circuit that determines an error in said target track data read in said target track, stores said adjacent track data in said memory, erases said adjacent track, and re-reads said target track data from said target track.

2. The disk drive of claim 1, wherein said circuit further writes said adjacent track data onto said adjacent track.

3. The disk drive of claim 1, wherein said target track data is rewritten onto said target track.

4. The disk drive of claim 1, wherein said circuit determines whether said re-read target data includes an error, re-erases said adjacent track and re-reads said target track data in said target track.

5. A hard disk drive, comprising:
   a disk that contains a target track with target track data and an adjacent track with adjacent track data;
   a spindle motor that rotates said disk;
   a head that is coupled to said disk;
   a memory; and,
   circuit means for determining an error in target track data read from said target track, storing said adjacent track data in said memory, erasing said adjacent track, and reading data from said target track.

6. The disk drive of claim 5, wherein said circuit means further writes said adjacent track data onto said adjacent track.

7. The disk drive of claim 5, wherein said target track data is rewritten onto said target track.

8. The disk drive of claim 5, wherein said circuit means determines whether said re-read target track data includes an error, re-erases said adjacent track and re-reads said target track data in said target track.

9. A method for reading data in a hard disk-drive, comprising:
   providing a disk that has a target track and an adjacent track;
   reading target track data from the target track;
   determining an error in the target track data;
   reading adjacent track data from the adjacent track;
   storing the adjacent track data in a memory;
   erasing the adjacent track; and,
   reading the target track data from the target track.

10. The method of claim 9, further comprising writing the adjacent track data onto the adjacent track.

11. The method of claim 9, further comprising rewriting the target track data onto the target track.

12. The method of claim 9, further comprising determining whether the re-read target track data includes an error, re-erasing the adjacent track and re-reading the target track data in the target track.

* * * * *